2,302,074

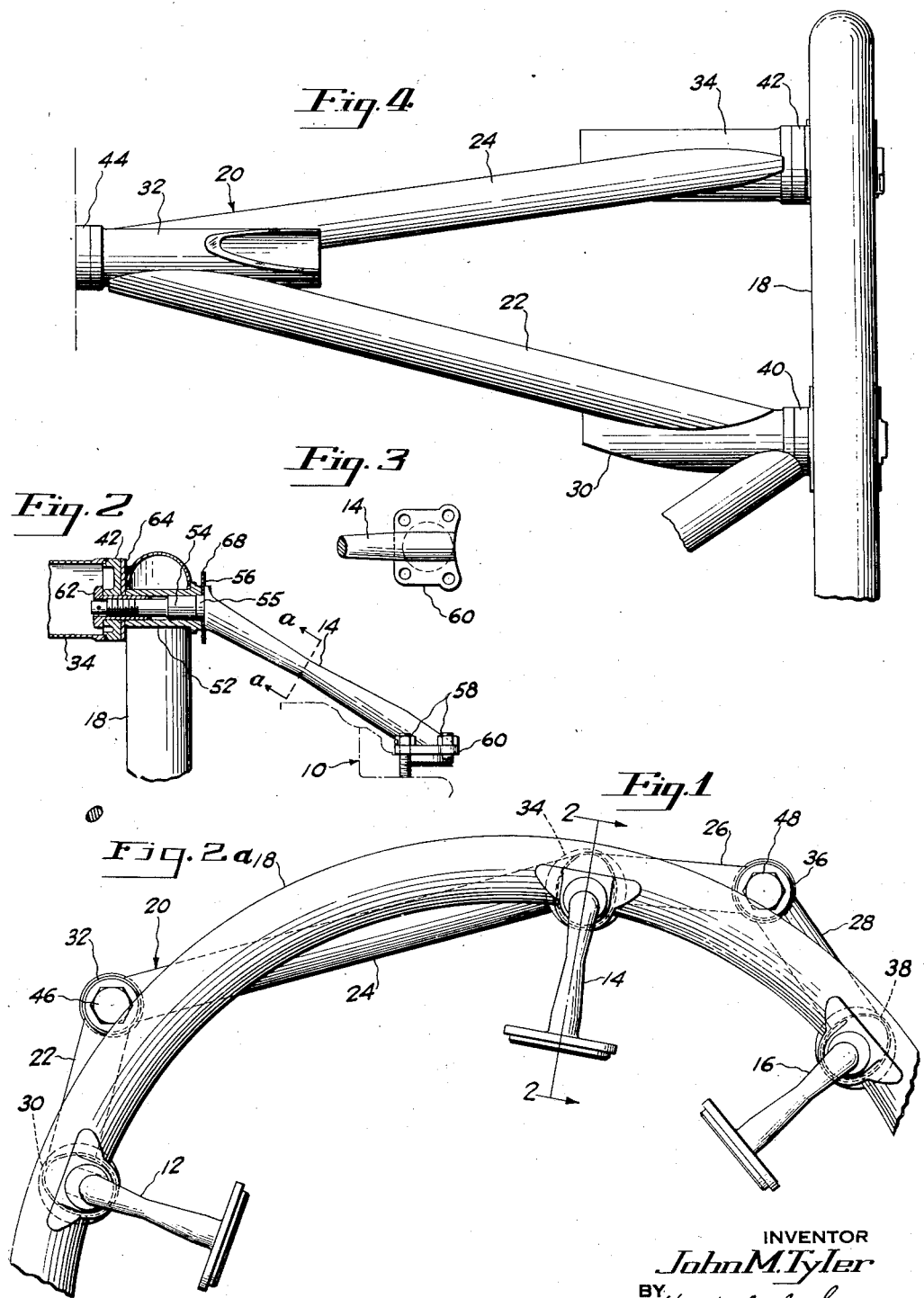
Nov. 17, 1942. J. M. TYLER 2,302,074
RESILIENT ENGINE MOUNT
Filed Dec. 20, 1939
INVENTOR
John M. Tyler
BY Harris G. Luther
ATTORNEY Patented Nov. 17, 1942

UNITED STATES PATENT OFFICE 2,302,074

RESILIENT ENGINE MOUNT

John M. Tyler, West Hartford, Conn., assignor to United Aircraft Corporation, East Hartford, Conn., a corporation of Delaware Application December 20, 1939, Serial No. 310,202

14 Claims. (Cl. 248—5)

This invention relates to improvements in resilient engine mounts and has particular reference to an improved resilient mount for an aircraft engine.

An object of the invention resides in the provision of an improved resilient engine mount constructed entirely of metal.

A further object resides in the provision of an improved resilient engine mount having controlled flexibility in various directions.

A still further object resides in the provision of a resilient engine mount constructed and arranged to facilitate the installation and removal of the engine.

Other objects and advantages will be more particularly pointed out hereinafter or will become apparent as the description proceeds.

In the accompanying drawing, in which like reference numerals are used to designate similar parts throughout, there is illustrated a suitable mechanical embodiment for the purpose of disclosing the invention. The drawing, however, is for purposes of illustration only and is not to be taken as limiting the invention since it will be apparent to those skilled in the art that various changes in the illustrated construction may be resorted to without in any way exceeding the scope of the invention.

In the drawing,

Fig. 1 is a front elevational view of a fragmentary portion of the improved engine mount.

Fig. 2 is a sectional view on the line 2—2 of Fig. 1.

Fig. 2a is a cross-sectional view of the spring member shown in Fig. 2 taken on the line a—a of Fig. 2.

Fig. 3 is a top-plan view of a fragmentary portion of the resilient mounting element shown in Fig. 2, and Fig. 4 is a side-elevational view of a fragmentary portion of the improved engine mount.

Referring to the drawing in detail, the numeral 10 generally indicates an engine, a fragmentary portion of the engine crankcase only being shown for the purpose of illustrating the application of the improved engine mount. While the mount shown is particularly adapted to support a radial type internal combustion engine such as is conventionally employed for the propulsion of aircraft, it is to be understood that this arrangement is illustrative only and that the principles of the invention are not limited to the application to any particular type of engine.

The engine is connected by means of a plurality of flexible spring brackets arranged in a spoke like manner, as indicated at 12, 14 and 16, to a mounting ring 18 supported on the airplane structure by means of a welded tubular frame generally indicated at 20.

The frame 20 comprises a number of tubular struts, as indicated at 22, 24, 26 and 28, welded at their ends to short tubular members of somewhat larger diameter, as indicated at 30, 32, 34, 36 and 38. The short tubular members at the engine end of the frame have their ends adjacent the ring 18 closed by apertured caps 40 and 42 welded thereto and have their opposite ends open and the tubular members at the opposite end of the frame have their ends facing the airplane structure closed by similar apertured caps as indicated at 44 and have their opposite ends open. All of the short tubular members are similarly constructed so that the complete frame presents a unitary structure having a series of annularly disposed apertured attachment points for securing the frame to the airplane structure and a similar series of annularly arranged apertured attachment points for securing the mounting ring and engine to the frame. The side portions of the short tubular members between the attached struts may be cut away, as is clearly illustrated in Fig. 4, to lighten the structure and provide larger openings for the insertion of tools into these tubular members. The frame 20 is secured to the airplane by means of bolts, two of which are indicated at 46 and 48 in Fig. 1, which bolts extend through the apertures in the cap members, one of which is indicated at 44 in Fig. 4, and through corresponding apertures, not illustrated, provided on the airplane structure. These bolts may be tightened by a suitable tool, such as a socket wrench, inserted in the open ended tubular members, two of which are indicated at 32 and 36.

The ring is provided with a plurality of cylindrical sleeve members, one of which is indicated at 52 in Fig. 2, the apertures of which are provided with non-circular portions and register with apertures in the caps on the ring attaching members, two such caps being indicated at 40 and 42. Each of the spring bracket members, such as 14, has at one end thereof a threaded stem 54 terminated at one end by a shoulder 56 and disposed at an angle to the main body portion of the bracket member such that the stems 54 are all substantially parallel to the longitudinal axis of the engine when the bracket members are attached to the engine by the bolts 58 extending through the pads 60 formed on the brackets at the ends opposite the ends provided with the stem 54. Each stem 54 has a non-circular key portion 55 cooperating with an elongated slot in the end of the respective ring attached sleeve 50 to restrain the bracket members against rotation relative to the sleeves in order that the brackets may effectively support the torque loads of the engine. The stem 54 extends through the respective sleeve 52 and through the aperture in the respective cap 42 and into the respective tubular member, such as 34, and there receives securing means in the form of the nut 62 which has an internally screw threaded cylindrical portion surrounding the stem 54 and a tool receiving portion at the end of the cylindrical portion. When the nut 62 is tightened, as by a socket wrench inserted through the open end of the tubular member 34, the sleeve 52 is clamped between the shoulder 56 and the cap 42. If desired, a face plate or washer, as indicated at 64 in Fig. 2, may be secured to the end of the sleeve 52 and to the adjacent portion of the ring 18 to overlie the end of each respective cap to provide bearing surfaces of relatively large area at the attachment point between the ring and the frame 20. The remaining brackets are all similarly constructed and attached to the engine carrying frame, the reinforcing ring 18 being secured to the frame by the bracket stems in the manner indicated. It has also been found desirable in some installations, in assembling the mount, to insert the stems 54 through suitable apertures in a metal fire wall 68 which is in the form of an apertured disc surrounding the engine immediately in front of the mounting ring 18.

With the above described arrangement the engine may be readily removed from the mount by removing the nuts from the bracket stems and moving the engine away from the frame 20. The ring 18 will go with the engine and it will not be necessary to remove engine accessories, such as the carburetor and air intake ducts, which project beyond the diameter of the ring at the rear of the engine. The frame 20 may also be readily removed from the airplane by simply removing the attachment bolts, two of which are indicated at 46 and 48 in Fig. 1.

The portion of each bracket member between the ring and the engine is preferably made of spring steel and carefully designed to give a desired spring rate frequency and controlled flexibility between the engine and the support. The intermediate portion of the bracket may be tapered from each end towards the center, as is clearly indicated in Fig. 2, and this portion may be given an elliptical cross-section, to give to the brackets different spring rates in directions tangentially to and radially of the ring 18. This difference in spring rates will provide the required resiliency opposed to engine torque to suppress torsional vibrations of the engine as well as the proper resiliency opposed to translatory movements of the engine to support the weight of the engine and modifying vibratory movements of a translatory or pitching character. These portions are also disposed at an angle to the plane including the mean diameter of the ring 18 in order that their longitudinal axes will converge at some selected point within the engine which point is so selected as to give to the resilient brackets their greatest vibration modifying effect.

While a suitable mechanical arrangement has been hereinabove described and illustrated in the accompanying drawing for the purpose of disclosing the invention, it is to be understood that the invention is not limited to the particular arrangement so illustrated and described, but that such changes in the size, shape and arrangements of the various parts may be resorted to as come within the scope of the subjoined claims.

Having now described the invention so that others skilled in the art may clearly understand the same, what it is desired to secure by Letters Patent is as follows:

1. A resilient engine mount comprising, an engine supporting frame, a mounting ring secured to said frame, and a plurality of elongated, integral, all metal, spring arms arranged in a single row around said engine and extending at an acute angle to the plane of said ring from said ring to said engine for resiliently supporting said engine from said frame and ring, said arms extending to one side of said ring and radially inwardly with respect thereto.

2. Means for resiliently supporting an aircraft engine on an aircraft structure comprising, a welded tube frame having short tubular members with apertured end closures at the frame attachment points, and spring brackets connected with said end closures to secure the engine to said frame.

3. Means for resiliently supporting an aircraft engine on an aircraft structure comprising, a welded tube frame structure having short tubular members with apertured end closures at the frame attachment points, bolts cooperating with the end closures at one end of said frame to connect said frame to said aircraft structure, and resilient spring brackets detachably associated with the end closures at the opposite end of said frame to secure said engine to said frame.

4. Means for resiliently supporting an aircraft engine on an aircraft structure comprising, a welded tube frame structure having short tubular members with apertured end closures at the frame attachment points, bolts cooperating with the end closures at one end of said frame to connect said frame to said aircraft structure, a mounting ring at the opposite end of said frame, and resilient spring brackets having portions extending through said mounting ring and detachably associated with the end closures at said opposite end of said frame, and portions secured to said engine.

5. Means for resiliently supporting an aircraft engine on an aircraft structure comprising, a welded tube frame structure having short tubular members with apertured end closures at the frame attachment points, bolts cooperating with the end closures at one end of said frame to connect said frame to said aircraft structure, a mounting ring having spaced sleeves provided with apertures at the opposite end of said frame, and resilient spring arms having end portions extending through said sleeve apertures and secured against rotation relative thereto and detachably associated with the end closures at said opposite end of said frame, and flattened end portions on said spring arms opposite said frame associated end portions securely attached to said engine.

6. The arrangement as set forth in claim 5 in which each spring arm has an intermediate portion of non-circular cross section between said end portions.

7. The arrangement as set forth in claim 5 in which each spring arm has an intermediate portion of non-circular cross section between said end portions tapered from said end portions toward the mid-length of said intermediate portion.

8. The arrangement as set forth in claim 5 in which the arm receiving portion of the engine has a less circumference than said mounting ring and is spaced from the plane including the mean circumference of said ring.

9. A resilient bracket for securing an engine to an engine support comprising, an integral metal member having an elongated intermediate portion and an attachment portion at each end of said intermediate portion, said intermediate portion having a generally elliptical reduced cross section shape near the mid-length thereof and tapering from both ends toward the mid-length portion.

10. A resilient bracket for securing an engine to an engine support comprising, an integral metal member having an elongated intermediate portion and an integral attachment portion at each end of said intermediate portion, said attachment portions arranged at an angle to said intermediate portion such that the longitudinal center line of said intermediate portion makes an acute angle with the center line of each of said attachment portions, said attachment portions having means including extensions maintaining the support attached portion against movement relative to the support and the engine attached portion against movement relative to the engine.

11. A resilient engine mount comprising, a frame, a mounting ring and a plurality of mounting brackets angularly spaced about said ring and having spring arms disposed between said engine and said ring for securing said engine to said ring and connecting portions integral with said spring arms extending from said ring to said frame to secure said engine and said ring to said frame.

12. A resilient engine mount comprising, a frame, a mounting ring, and a plurality of mounting brackets angularly spaced about said ring and having spring arms disposed between said engine and said ring for securing said engine to said ring and connecting portions integral with said spring arms extending from said ring to said frame to secure said engine and said ring to said frame, said connecting portions being disposed with their longitudinal center lines parallel to the axis of rotation of said engine.

13. A resilient engine mount comprising, a frame, a mounting ring and a plurality of mounting brackets angularly spaced about said ring and having spring arms disposed between said engine and said ring for securing said engine to said ring, and connecting portions integral with said spring arms extending from said ring to said frame to secure said engine and said ring to said frame, said connecting portions being disposed with their longitudinal center lines parallel to the axis of rotation of said engine, and interengaging means on said connecting portions and said ring to restrain said arms against rotation relative to said ring.

14. In combination, an engine, a frame, an engine mount ring carried by said frame, and resilient means for securing said engine to said mount ring comprising, a plurality of elongated metal spring arms and means for rigidly securing one end of each of said arms to said ring and the opposite end of each of said arms to said engine, each of said arms having a reduced portion intermediate the ends thereof for imparting flexibility to said arms in all transverse directions.

JOHN M. TYLER.